United States Patent [19]

Wu

[11] Patent Number: 5,038,361

[45] Date of Patent: Aug. 6, 1991

[54] PAINT DRYING FURNACE

[76] Inventor: Ching S. Wu, No. 22, Hsin Chen Street, Tainan, Taiwan

[21] Appl. No.: 268,958

[22] Filed: Nov. 9, 1988

[51] Int. Cl.$^5$ .............................................. G01K 11/22

[52] U.S. Cl. .......................................... 373/119; 34/39

[58] Field of Search ........................ 34/1, 4, 39, 40, 41; 373/119, 130, 5

[56] References Cited

U.S. PATENT DOCUMENTS 2,360,257 10/1944 Muller et al. ........................ 34/39 X 2,529,704 11/1950 Olsen .................................. 34/39 X 3,271,874 9/1966 Oppenheimer ...................... 34/39 X

*Primary Examiner*—Henry A. Bennet

[57] ABSTRACT

This invention relates to an improved paint drying furnace and in particular to one having a square recess to receive a casing which contains a glass, several light bulbs, a ceramic reflective plate, an electric heating plate and a heat resisting plate. The light bulbs can emit near infrared, middle infrared and far infrared energy to dry the painted object and are controlled by an outer control panel.

4 Claims, 4 Drawing Sheets

PAINT DRYING FURNACE

BACKGROUND OF THE INVENTION

Paint drying furnaces have been widely adopted by industry to make their product have an attractive appearance and have a longer life by applying the paint on the surface of the product and putting it in a drying furnace to dry the paint with gas, far infrared, middle infrared or near infrared energy. However, such drying furnaces still exhibit some problems, such as: (1) workers must adjust the electric heating material in the furnace manually whenever the painted object is different in shape or size and (2) should any part of the electric heating material malfunction, the drying procedure must stop immediately?

In light of these problems an improved paint drying furnace is provided which has a square recess at one side of the drying furnace to install light bulbs for easy installation and maintenance.

SUMMARY OF THE INVENTION

It is the primary object of the present invention to provide an improved paint drying furnace which saves electric energy.

It is another object of the present invention to provide an improved paint drying furnace which is easy to maintain.

It is a further object of the present invention to provide an improved paint drying furnace which is easy to install.

The above, and other objects, features and advantage of the present invention will become apparent from the following description read in conjunction with the accompanying drawings in which like reference numbers designate the same elements.

DETAILED DESCRIPTION OF THE PREFERRED EMBODIMENT

Figure 1:
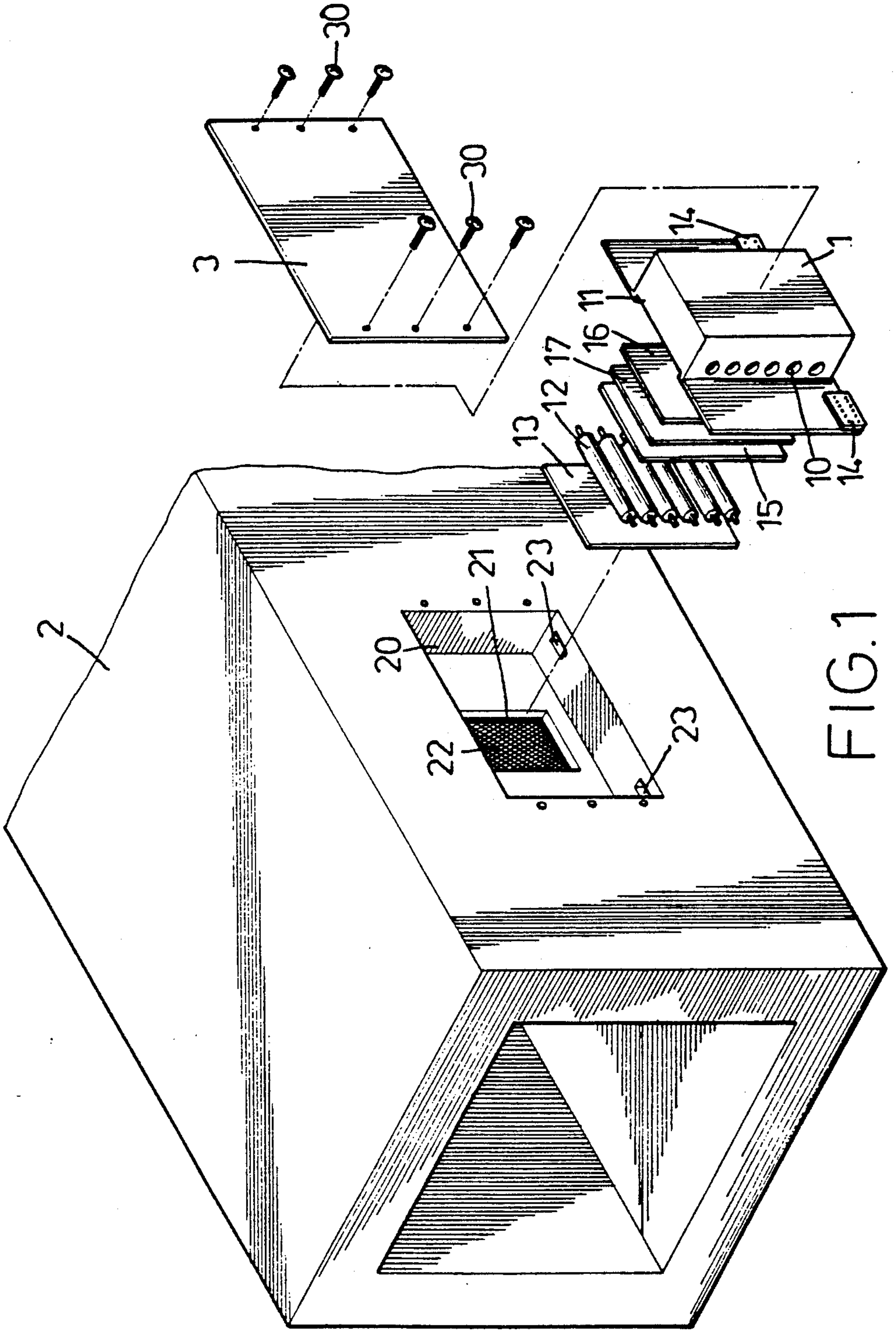
FIG. 1 is an exploded view of the present invention.

FIG. 1 is an exploded view of the present invention which comprises a casing 1 having several holes 10, a chamber 11, a set of light bulbs 12, a glass, a wiring board 14, a ceramic reflective plate 15, a heat resisting plate 16 and a heating plate 17, which may be a conventional heating plate of ceramic composition having heating elements formed thereon or therein such as heating plates shown in prior U.S. Pat. Nos. 3,679,473; 3,846,620; or 3,813,520, the particular type of heating plate 17 not being important to the inventive concept as herein described a drying furnace 2 having a square recess 20, a square hole 21, a protection net 22 and a guide trough 23 and a cover 3.

Figure 2:
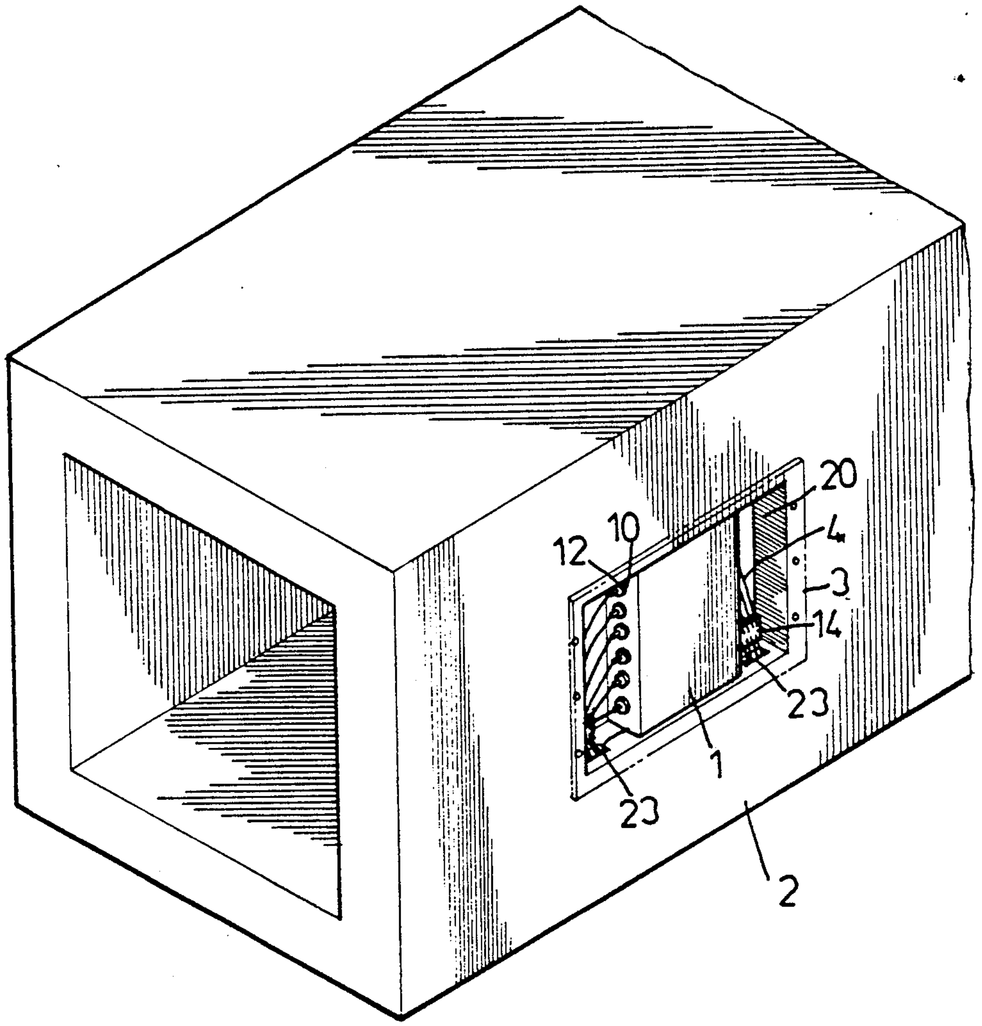
FIG. 2 is an assembled view of the present invention.

The heating unit is assembled by first placing the heat resisting plate 16, the heating plate 17, the ceramic reflective plate 15, the light bulbs 12 and the glass 13 in the chamber 11 of the casing 1 sequently such that the connectors on the opposing ends of each light bulb 12 extend from the holes 10 and insert into the square recess 20 of the drying furnace 2 with each of the connectors of the light bulbs 12 connected with the one side of the wiring board 14 and the other side of the board 14 connected with an outer control panel to independently control each of the light bulbs 12 place. Then the cover 3 is placed over the square recess 20 and secured to the outside of the furnace 2 with a plurality of screws, as shown in FIG. 2.

Figure 3:
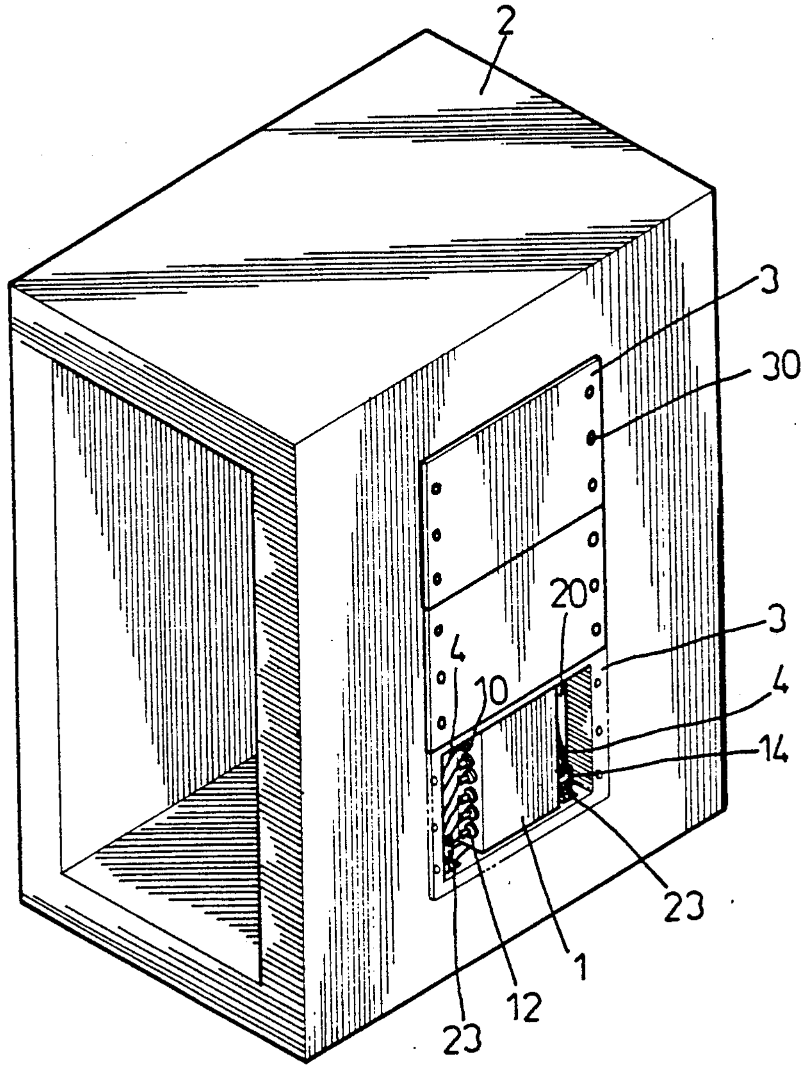
FIG. 3 is a perspective view of another embodiment of the present invention.

Referring to FIG. 3, there is shown a perspective view of another embodiment of the present invention. In this embodiment improved efficiency of a drying furnace is obtained by having 2 or 3 of the heating assemblies of FIG. 1 installed. The efficiency may even be further improved if the aft part of the light bulbs 12 is treated with a reflective material to prevent infrared energy from being emitted to the rear of the assembly. Additionally the surface of the ceramic reflective plate 15 may be formed in a wave or arc shape or some like shape for producing the best reflection.

Figure 4:
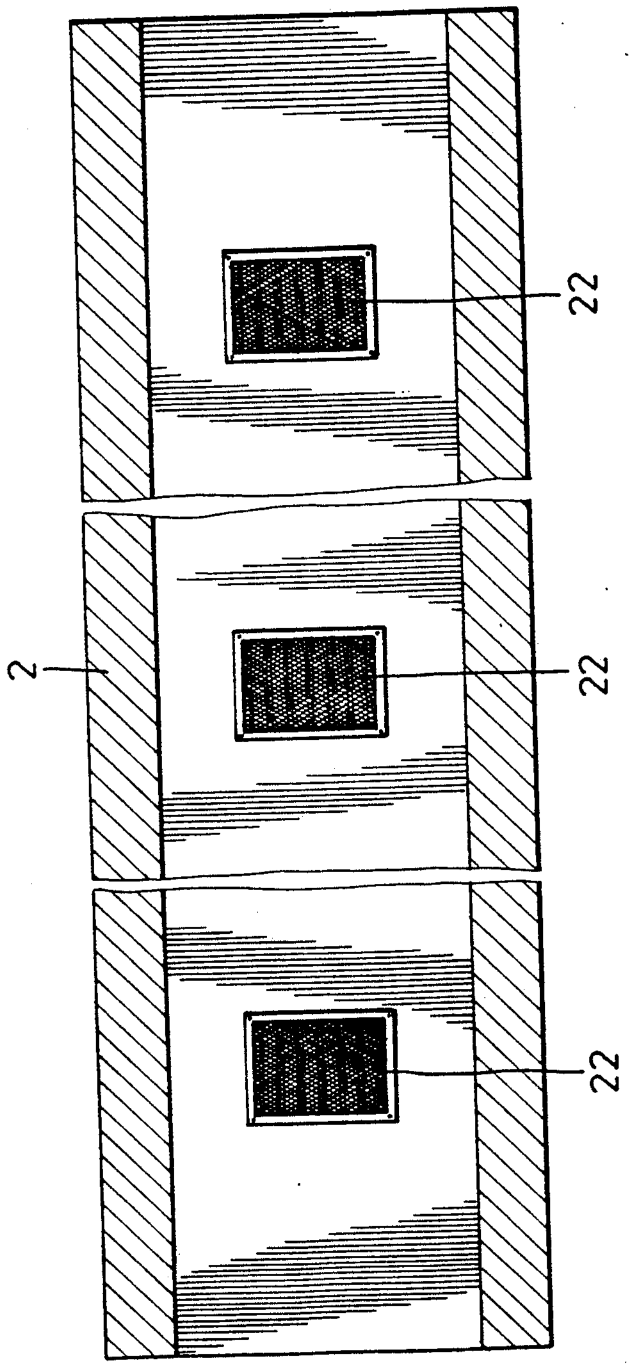
FIG. 4 is another perspective view of a multi-zone embodiment the present invention.

In FIG. 4 is shown a perspective view of a multi zone embodiment of the present invention. Three drying furnaces are provided each having installed the heating unit of the present invention which together form two different zones; low temperature zone 6 and high temperature zone 5. For the embodiment shown in this figure the paint drying furnace heating units may be arranged in a temperature sequence of either lo-hi-lo-hi-lo-hi-lo or hi-lo-hi-lo-hi-lo-hi. With such an arrangement, when the painted object passes through the high temperature zone the near infrared energy will there by raise the painted object's temperature rapidly and make the paint molecules vibrate to absorb the middle and far infrared energy. The low temperature zone 6 serves to keep the painted object from being scotched.

I claim:

1. An improved paint drying furnace comprising:

an enclosure having an interior cavity defined by a plurality of wall members;

a recess formed in an exterior portion of one of said wall members, said recess having a substantially square-shaped aperture formed therethrough defining an opening between said recess and said interior cavity of said furnace; and, means for heating said interior cavity disposed within said recess, said heating means including:

(1) a housing having an open chamber defined by a back wall, a pair of opposing side walls and a pair of opposing end walls, said pair of opposing side walls each having a plurality of through openings formed therein;

(2) an insulating plate member disposed within said chamber adjacent said back wall;

(3) a heating plate member disposed within said chamber adjacent said insulating plate member;

(4) a reflective member having a predetermined contour disposed within said chamber adjacent said heating plate member, said reflective member being formed of a ceramic material composition;

(5) a plurality of electric lamp members wherein each of said plurality of electric lamp members has an electrical connector on opposing ends thereof, each of said lamp members being disposed within said chamber and having said opposing ends of said lamp members extending through respective ones of said plurality of side wall through openings; and, (6) a cover glass member disposed within said chamber in overlaying relationship with said plurality of lamps.

2. The paint drying furnace as recited in claim 1 where said predetermined contour of said reflective plate member is arcuate for substantially improving the reflectivity thereof.

3. The paint drying furnace as recited in claim 1 where said plurality of electric lamps have an emission spectrum including (1) a near infrared bandwidth, (2) a middle infrared bandwidth, (3) a far infrared bandwidth, or (4) any combination of two of said bandwidths.

4. The paint drying furnace as recited in claim 1 where said furnace has a plurality of differing temperature zones, said temperature zones differing in temperature one from another in a predetermined pattern.

* * * * *